United States Patent
Bauch et al.

(10) Patent No.: US 9,156,179 B2
(45) Date of Patent: Oct. 13, 2015

(54) SEPARATING PROCESSED SHEET PRODUCTS

(71) Applicant: TRUMPF Sachsen GmbH, Neukirch (DE)

(72) Inventors: Heiko Bauch, Bautzen (DE); Christoph Protze, Singwitz (DE); Andreas Schmidt, Hochkirch (DE)

(73) Assignee: TRUMPF Sachsen GmbH, Neukirch (DE)

( * ) Notice: Subject to any disclaimer, the term of this patent is extended or adjusted under 35 U.S.C. 154(b) by 408 days.

(21) Appl. No.: 13/890,301

(22) Filed: May 9, 2013

(65) Prior Publication Data
US 2013/0298739 A1 Nov. 14, 2013

(30) Foreign Application Priority Data
May 10, 2012 (DE) .......... 10 2012 207 818

(51) Int. Cl.
| | | |
|---|---|---|
| B26D 7/18 | (2006.01) |
| B21D 28/10 | (2006.01) |
| B21D 43/28 | (2006.01) |
| B23Q 7/04 | (2006.01) |

(52) U.S. Cl.
CPC *B26D 7/18* (2013.01); *B21D 28/10* (2013.01); *B21D 43/282* (2013.01); *B23Q 7/04* (2013.01); *Y10T 83/0467* (2015.04); *Y10T 83/2074* (2015.04)

(58) Field of Classification Search
CPC .................................. B26D 7/18; B23K 26/00
USPC .......... 83/23, 27, 102; 269/55, 58; 219/121.6, 219/121.85; 209/655
See application file for complete search history.

(56) References Cited

U.S. PATENT DOCUMENTS

| | | | |
|---|---|---|---|
| 2,168,400 A * | 8/1939 | Evers ................. 83/37 |
| 4,040,318 A * | 8/1977 | Makeev et al. ............. 83/76.8 |
| 2008/0023900 A1 | 1/2008 | Sohka et al. |
| 2009/0116939 A1* | 5/2009 | Weber et al. ............. 414/222.11 |

* cited by examiner

Primary Examiner — Samuel M Heinrich
(74) Attorney, Agent, or Firm — Fish & Richardson P.C.

(57) ABSTRACT

Separating and/or sorting processed workpieces cut from a metal sheet, and the remnant surrounding the workpiece, is performed by holding the workpieces and remnant in a co-planar state after processing, moving the held workpieces and remnant away from a processing area, and then, with the workpiece and remnant still held, moving the workpiece and remnant relative to one another with a separating movement perpendicular to the workpiece plane, to such an extent that the workpiece is displaced outside the remnant.

17 Claims, 4 Drawing Sheets

SEPARATING PROCESSED SHEET PRODUCTS

CROSS REFERENCE TO RELATED APPLICATION

Under 35 U.S.C. §119, this application claims the benefit of a foreign priority application filed in Germany, serial number 10 2012 207 818.5, filed on May 10, 2012. The contents of this priority application are hereby incorporated by reference in its entirety.

TECHNICAL FIELD

The invention relates to separating and/or sorting processed sheet-metal products on a machine tool.

BACKGROUND

US 2008/0023900 A1 discloses a system for the laser cutting of sheet-like workpieces. In front of a laser cutting unit there is arranged a pallet changer having a support, onto which the cut sheets are fed after processing by cutting. On a cut sheet, finished parts in the form of workpiece blanks are surrounded by a workpiece remnant in the form of a scrap skeleton. By means of a handling device, the finished parts and the scrap skeleton of a processed sheet are together removed from the workpiece support of the pallet changer. For that purpose, the handling device has a gripping unit with two lifting forks that are movable in opposite directions on a carrier frame of the handling device. In order to take up a processed sheet, the handling device moves on a guide structure into a position above the support of the pallet changer. The lifting forks of the handling device, which have been moved into their open position, are then lowered to a level at which they are located beneath the workpiece that is to be taken up. After the lifting forks have been moved in opposite directions into their gripping position and consequently grip the processed workpiece on its underside, the lifting forks are raised together with the finished parts and the scrap skeleton of the processed sheet. The handling device with the finished parts positioned thereon and the scrap skeleton positioned thereon then moves laterally over a workpiece table. By lowering the lifting forks and then moving them into the open position, the processed sheet, with the finished parts and the scrap skeleton surrounding them, is deposited by the handling device on the workpiece table. The lifting forks of the handling device are then raised above the workpiece table again, and the handling device moves laterally back into the position above the support of the pallet changer. When the handling device has left the vicinity of the workpiece table, a gate-like frame structure moves over the workpiece table. The scrap skeleton deposited on the workpiece table is fixed to the frame structure spanning the workpiece table. The workpiece table is then lowered to a level beneath the scrap skeleton fixed to the frame structure. The lowering movement of the workpiece table is followed by the finished parts deposited on the workpiece table, which are thereby separated from the scrap skeleton fixed to the frame structure.

Improvements to such methods and systems are sought.

SUMMARY

According to one aspect of the invention, the separation of a workpiece blank and a workpiece remnant takes place on a handling device and while the workpiece blank and the workpiece remnant are held from beneath by the handling device. Accordingly, the handling of a processed sheet and the separation of the processed products are linked together. In terms of the method, the transport of the processed sheet and the separation of blank from remnant are carried out simultaneously. In terms of the device, additional devices for later separating the processed products are unnecessary. This results in particular in a compact arrangement of machine components.

The holding unit may be provided with at least two support elements which are movable in opposite directions relative to one another, parallel to a movement plane, into an open position and a holding position. When the handling device is arranged on the blank and the remnant surrounding it, the movement plane of the support elements extends parallel to the workpiece plane. When the support elements have been moved into the open position, they are at a distance from one another, parallel to the movement plane, which is greater than the size of the workpiece blank and the workpiece remnant surrounding it in the workpiece plane. When the support elements have been moved into the holding position, they can be transferred, parallel to the movement plane, into a position in which the blank and the remnant surrounding it can be held from beneath and positioned by the support elements parallel to the workpiece plane.

In some embodiments, at least one of the processed products that are to be separated from one another is fixed during the separating movement and consequently oriented in a defined manner. The processed products that are to be separated from one another are thereby prevented in particular from tipping and/or becoming caught on one another.

In some cases, only one of the processed products is moved, and the other processed product remains in the workpiece plane. The design-related implementation of this method variant is simple insofar as a lifting device for producing the separating movement of the blank and the remnant is to be provided for only one of the two processed products.

If only one of the processed products is moved in order to separate the blank and remnant, it is recommended, in the interest of maximum process reliability, to hold the processed product that remains in the workpiece plane, during the separating movement, in the position that it has assumed. As a result, the processed product that is to remain in the workpiece plane is prevented from following all or part of the separating movement executed by the other processed product and consequently impeding the separating operation. The holding force for fixing the processed product that remains in the workpiece plane can be produced in different ways.

In the preferred case, in which the workpiece plane is oriented horizontally and the separating movement is executed as a vertical movement, gravity can preferably be used to fix the processed product in question in the workpiece plane. In addition or alternatively, it is possible to produce the holding force that is to be exerted on the processed product that remains in the workpiece plane by means of a separate device.

In some instances, the workpiece blank remains in the workpiece plane while the workpiece remnant is moved perpendicularly to the workpiece plane. This measure is recommended in view of the fact that the workpiece remnant obtained in a large number of processing cases is a scrap skeleton which surrounds a plurality of workpiece blanks as a coherent structure, and that a scrap skeleton is easier to handle, in connection with the separating movement, than the plurality of workpiece blanks.

In a further preferred variant, in cases where the workpiece plane is oriented horizontally and, with a vertical separating movement, one processed product is arranged above the other, the processed product located at a higher level is retained in the position that it has assumed. This allows the processed products separated from one another to be discharged from the handling device separately in a simple manner, namely using gravity. If, after the separating operation, the holding unit of the handling device is released, the processed product that is not being retained is able to leave the handling device under the effect of gravity. The processed product that, at first, is still held in the handling device can then be discharged from the handling device.

In some examples, the workpiece remnant is arranged in the vertical direction above the workpiece blank. If the workpiece remnant is held in the raised position, then the workpiece blank can be handled in good time and without being impeded by the workpiece remnant, and in particular can be discharged from the handling device using gravity.

In some embodiments the separating movement, when considered over the surface area of the workpiece blank and/or over the surface area of the workpiece remnant, is carried out with different values. Accordingly, the separating movement is adapted in a flexible manner to the circumstances relating to the workpiece blank and the workpiece remnant. This can be advantageous, for example, when the processed workpiece, and accordingly also a scrap skeleton produced during processing of the workpiece, have only a small thickness. If the scrap skeleton is moved relative to the workpiece blank or blanks during the separating operation and the value of the separating movement varies over the surface of the scrap skeleton, a bend can be produced in places on the scrap skeleton, which facilitates the separation of the scrap skeleton and of the workpiece blank or blanks and thereby ensures the functionally reliable separation of the workpiece blank and the scrap skeleton.

An example of the invention will be explained in greater detail below by means of schematic representations.

DETAILED DESCRIPTION

Figure 1:
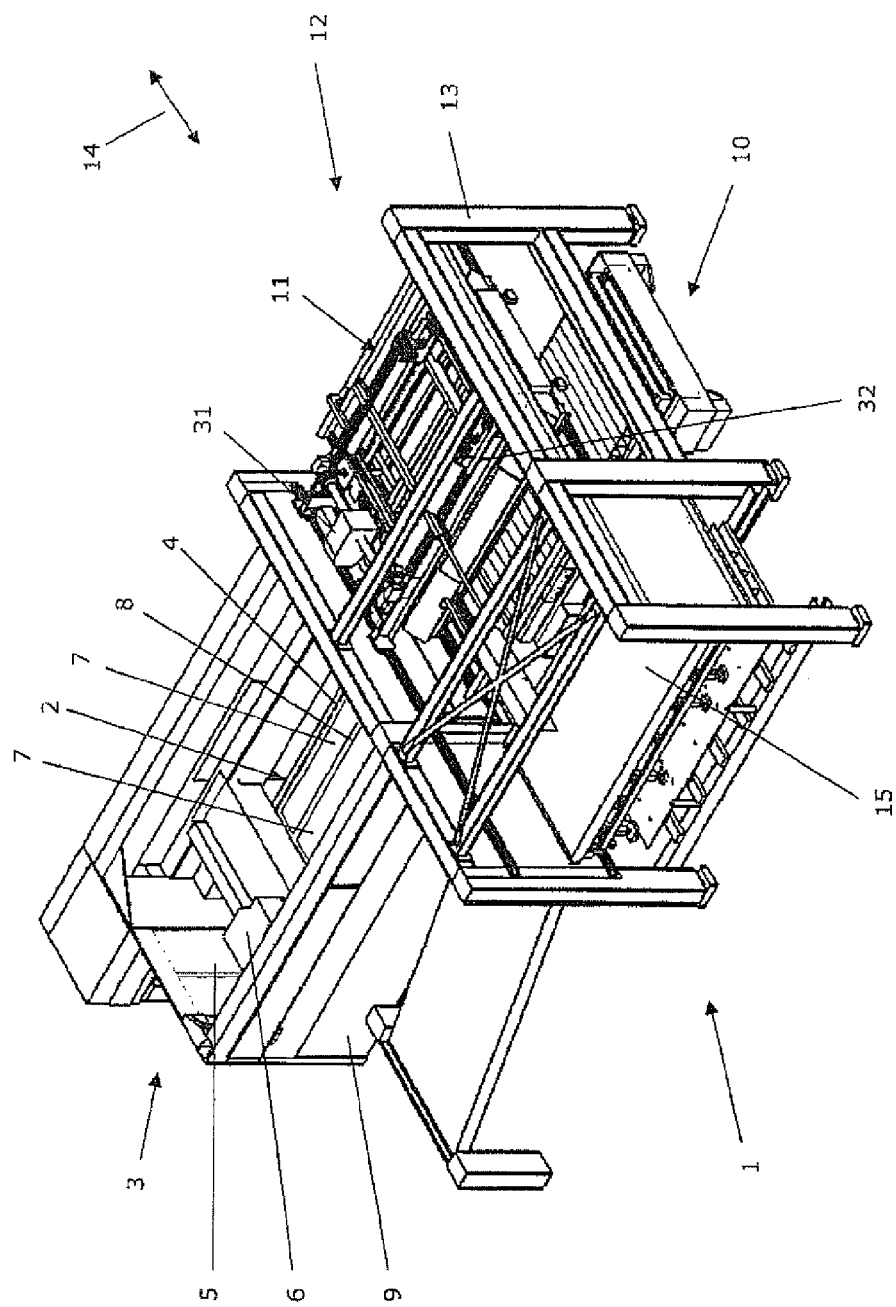
FIG. 1 shows a machine for the laser cutting of metal sheets, with an associated automation unit having a handling device.

Referring first to FIG. 1, a machine arrangement 1 for the processing of metal sheets 2 by cutting comprises as the cutting device a machine tool in the form of a laser cutting machine 3.

For processing by cutting, a laser cutting head 6 of the laser cutting machine 3 is moved in known manner over a metal sheet 2, which is arranged on a pallet 4 inside a working area 5 of the laser cutting machine 3. FIG. 1 shows a metal sheet 2 inside the working area 5 after processing by cutting, in which there have been produced as the processed products workpiece blanks in the form of finished parts 7 and a workpiece remnant surrounding the finished parts 7 as a scrap skeleton 8. Between the finished parts 7 and the scrap skeleton 8 there is a kerf of a few millimeters in width.

The pallet 4 with the unprocessed metal sheet 2 was moved through an end opening in a housing 9 of the laser cutting machine 3 into the working area 5 thereof. The pallet 4 with the unprocessed metal sheet 2 was previously positioned on a conventional pallet changer 10 at the end of the laser cutting machine 3. After processing of the metal sheet 2, the pallet 4 is moved back onto the pallet changer 10 with the finished parts 7 and the scrap skeleton 8 that are then present. From the pallet changer 10, the finished parts 7 and the scrap skeleton 8 are together discharged by means of a handling device 11 of an automation unit 12.

The handling device 11 can be displaced, driven by a motor, on a carrier structure 13 of the automation unit 12 in the direction indicated by the twin-headed arrow 14. The handling device 11 can be moved either over the pallet changer 10 or over a product support 15 arranged laterally next to the pallet changer 10. In addition, in the example shown, the handling device 11 can approach a raw metal sheet pallet (not shown in FIG. 1), on which unprocessed metal sheets 2 are provided.

In FIG. 1, the pallet 4 with the processed metal sheet 2 is still inside the working area 5 of the laser cutting machine 3. After the pallet 4 and the processed metal sheet 2 have been transferred to the pallet changer 10, the circumstances shown in highly schematic form in FIG. 2 are obtained.

Figure 2:
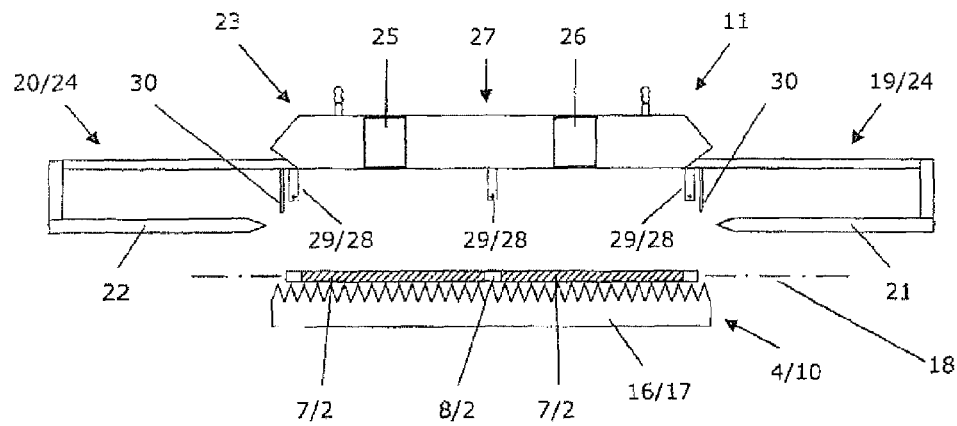
FIGS. 2-8 schematically and sequentially illustrate the handling of processed metal sheets on the machine of FIG. 1.

There can be seen in FIG. 2 one of a plurality of support rails 16 of a workpiece support 17 of the pallet 4, which support rails 16 are arranged at intervals one behind the other perpendicularly to the plane of projection of FIG. 2. The processed metal sheet 2 with the finished parts 7 and the scrap skeleton 8 is positioned on points of the support rails 16. The finished parts 7 and the scrap skeleton 8 lie in a horizontal workpiece plane 18, which is indicated by a dot-dash line in FIG. 2.

The handling device 11 has approached the position above the pallet changer 10 or the pallet 4. Rake-like gripping elements 19, 20 with rake prongs 21, 22 located one behind the other perpendicularly to the plane of projection of FIG. 2 with gaps between them have moved into an open position on a carrier structure of the handling device 11 in the form of a carrier frame 23. In the open position according to FIG. 2, the rake-like gripping elements 19, 20 are arranged parallel to the workpiece plane 18 at a distance from one another which is slightly larger than the width of the processed metal sheet 2. The rake-like gripping elements 19, 20 together form a gripping unit 24 of the handling device 11. A rake motor drive 25, shown schematically in FIG. 2, on the carrier frame 23 serves to move the rake-like gripping elements 19, 20.

Adjacent to the rake drive 25 is a lifting motor drive 26, which is likewise provided on the carrier frame 23. The lifting drive 26 is part of a lifting unit 27, which additionally comprises a holding device 28. The holding device 28 has a plurality of holding members 29, which are guided on the carrier frame 23 of the handling device 11 and can be raised and lowered in the vertical direction by means of the lifting drive 26. In the example shown, the holding members 29 are in the form of holding magnets. Other types of holding members, for example suction holders, are conceivable. In the vicinity of the outer holding members 29, the carrier frame 23 of the handling device 11 is provided with strippers 30, which are fixedly connected to the carrier frame 23 and extend along the longitudinal edges of the carrier frame 23, which in FIG. 2 run perpendicular to the plane of projection.

The carrier frame 23 of the handling device 11 with all the attached parts can be lifted and lowered in the vertical direction by means of a lifting drive motor 31 which can be seen in FIG. 1. Also to be seen in FIG. 1 is a chassis 32 of the handling device 11, which supports the carrier frame 32 with its attached parts in a vertically movable manner and, driven by means of a motor, can be displaced on the carrier structure 13 of the automation unit 12.

Figure 3:
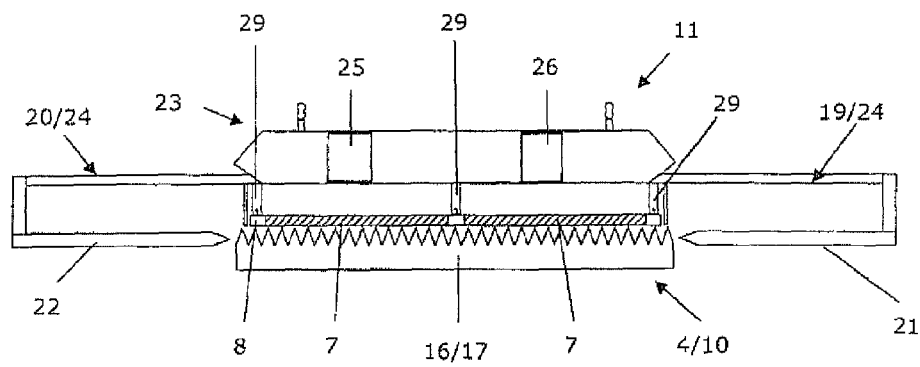

In order to discharge the processed metal sheet 2 from the vicinity of the laser cutting machine 3, the carrier frame 23 with the rake-like gripping elements 19, 20 in the open position is lowered, starting from the situation according to FIG. 2, into the position according to FIG. 3. During the lowering movement, the rake prongs 21, 22 of the rake-like gripping elements 19, 20 pass the processed metal sheet 2 and come to lie at a level slightly beneath the underside of the processed metal sheet 2. The holding members 29 touch the upper side of the processed metal sheet 2 in the region of the scrap skeleton 8. In contact with the holding members 29, the scrap skeleton 8 is fixed thereto.

The rake-like gripping elements 19, 20 are then moved towards one another by means of the rake drive 25. The rake prongs 21, 22 thereby enter the gaps between the support rails 16 of the workpiece support 17 on the pallet 4. The rake-like gripping elements 19, 20 thereby reach a gripping position, in which they grip the finished parts 7 and the scrap skeleton 8 together from beneath.

Figure 4:
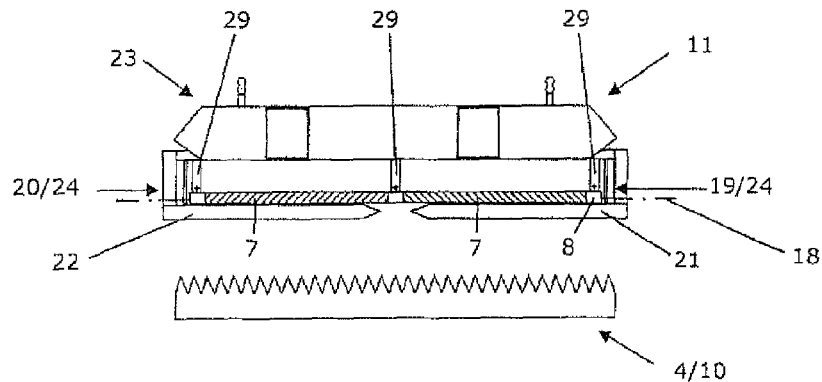

With the rake-like gripping elements 19, 20 moved into the gripping position, and with the finished parts 7 and the scrap skeleton 8, the carrier frame 23 of the handling device 11 is moved upwards by means of the lifting drive motor 31. The finished parts 7 and the scrap skeleton 8 of the processed metal sheet 2 are thereby lifted from the workpiece support 17 of the pallet 4, and the circumstances shown in FIG. 4 are obtained. The finished parts 7 and the scrap skeleton 8 rest with their underside on the upper side of the rake prongs 21, 22 of the rake-like gripping elements 19, 20 and are thereby together positioned in the workpiece plane 18. The processed products that are to be separated from one another are thus arranged optimally for the subsequent separating operation. In particular, the position of the parts on the rake-like gripping elements 19, 20 prevents the finished parts 7 from tipping within the scrap skeleton 8 in an undefined manner and thereby impeding or even preventing the subsequent separation of the processed products.

Figure 5:
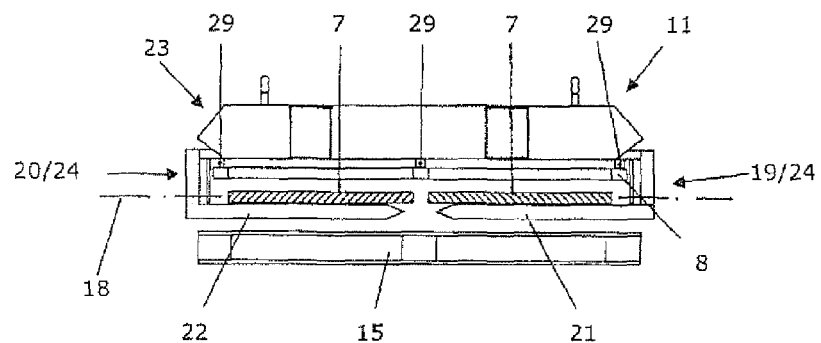

In order to separate the finished parts 7 from the scrap skeleton 8, the holding members 29 of the holding device 28 are raised in the vertical direction into the position according to FIG. 5 by operation of the lifting drive 26. The holding members 29 thereby carry with them in the lifting direction the scrap skeleton 8 fixed thereto. Owing to the force of gravity acting on them, the finished parts 7 retain their position in the workpiece plane 18. On account of the vertical separating movement which is executed by the scrap skeleton 8 relative to the finished parts 7, the finished parts 7 come away from the scrap skeleton 8. Because the separation of the finished parts 7 and of the scrap skeleton 8 is carried out while the finished parts 7 and the scrap skeleton 8 are gripped from beneath by the gripping unit 24, the finished parts 7 remain on the upper side of the rake prongs 21, 22 of the rake-like gripping elements 19, 20 after being separated from the scrap skeleton 8, where they are ready for further handling measures, which can be carried out without being impeded by the scrap skeleton 8.

In the example shown, the holding members 29 of the holding device 28 execute strokes of a uniform value (for example 50 mm) as the vertical separating movement. In a departure therefrom, strokes of the lifting members 29 of different values are conceivable, where required for functionally reliable separation of the finished parts 7 and the scrap skeleton 8.

Separation of the finished parts 7 and the scrap skeleton 8 can be carried out while the handling device 11 is arranged above the pallet changer 10. However, it is also possible for the separation of the finished parts 7 and the scrap skeleton 8 on the one hand and a displacement movement of the handling device 11 along the carrier structure 13 of the automation unit 12 on the other hand to be carried out in parallel in terms of time.

Figure 6:
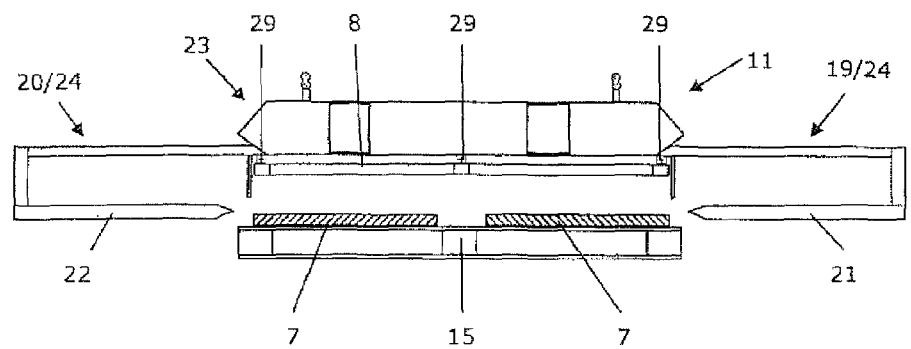

At the end of the last-mentioned displacement movement, the handling device 11 with the processed products positioned thereon is arranged above the product support 15 (FIG. 5). Starting from those circumstances, the carrier frame 23 of the handling device 11 is lowered to the level according to FIG. 6. The rake-like gripping elements 19, 20 are then moved by means of the rake drive 25 from the gripping position into the open position. The finished parts 7 positioned on the rake prongs 21, 22 are thereby stripped from the rake prongs 21, 22 by means of the strippers 30 and pass under the effect of gravity onto the product support 15. The scrap skeleton 8 continues to be fixed to the raised holding members 29 of the holding device 28. Overall, the situation according to FIG. 6 is thereby reached.

The finished parts 7 are then discharged from the product support 15. This can be carried out manually, for example. Alternatively, it is conceivable, when using a product support 15 in the form of a continuous circulating conveyor belt, for the finished parts 7 to be removed from the product support 15 in an automated manner.

Figure 7:
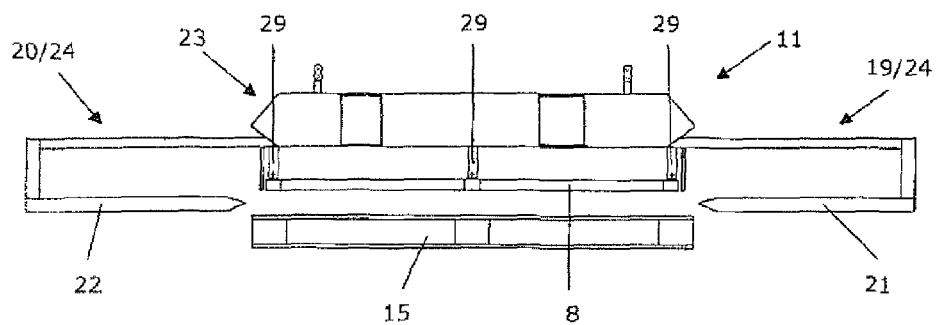
Figure 8:
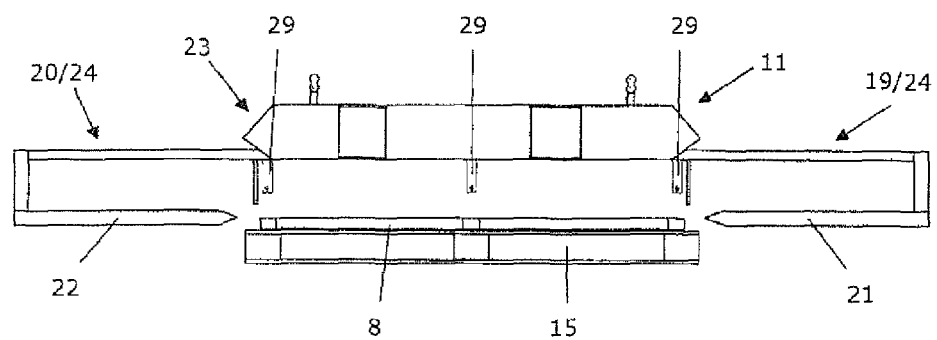

When the finished parts 7 have been unloaded from the product support 15, the holding members 29 of the holding device 28, together with the scrap skeleton 8 fixed to the holding members 29, are lowered into the position according to FIG. 7, with the rake-like gripping elements 19, 20 still in the open position. The holding members 29 are then deactivated, and the scrap skeleton 8 is deposited under the effect of gravity on the product support 15 (FIG. 8). The scrap skeleton 8 is then removed from the product support 15 manually or with the use of auxiliary machine means.

The handling device 11 is then in a state in which it can take up an unprocessed metal sheet 2 from the stack of raw metal sheets (not shown) and transport it to the pallet changer 10, from where the unprocessed metal sheet 2 is to be fed to the working area 5 of the laser cutting machine 3 for processing by cutting.

Alternatively, the handling device 11 can be used solely for discharging processed metal sheets 2 from the pallet changer 10. Loading of the pallet changer 10 with unprocessed metal sheets 2 then takes place manually or is carried out by a separate loading device. In that case, the loading of the pallet changer 10 with an unprocessed metal sheet 2 can be carried out at the same time as the separation of the processed products on the handling device 11.

Instead of the product support 15, on which both the finished parts 7 and the scrap skeleton 8 are deposited, separate pallets for the finished parts 7 and the scrap skeleton 8 are conceivable, both of which are approached by the handling device 11.

A number of embodiments of the invention have been described. Nevertheless, it will be understood that various modifications may be made without departing from the spirit and scope of the invention. Accordingly, other embodiments are within the scope of the following claims.

What is claimed is:

1. A method of separating a processed workpiece blank from a metal sheet remnant surrounding the workpiece blank, the method comprising:

holding the workpiece blank and the remnant in a sheet-parallel workpiece plane, with a holding unit of a handling device that positions the workpiece blank and the remnant in the workpiece plane; and then, moving the workpiece blank and remnant relative to one another on the handling device with a separating movement perpendicular to the workpiece plane, to such an extent that the workpiece blank is displaced outside the remnant while both the workpiece blank and remnant are supported by the handling device.

2. The method according to claim 1, wherein moving the workpiece blank and remnant relative to one another comprises retaining one of the workpiece blank and remnant by a lifting device, and then lifting the retained one of the workpiece blank and remnant in a direction perpendicular to the workpiece plane.

3. The method according to claim 2, wherein the remnant is retained by the lifting device and lifted in a direction perpendicular to the workpiece plane, while the workpiece blank remains positioned by the holding unit.

4. The method according to claim 1, wherein moving the workpiece blank and remnant relative to one another comprises:
   maintaining a position of one of the workpiece blank and the remnant within the workpiece plane with the holding unit of the handling device, while
   moving another of the workpiece blank and the remnant perpendicularly to the workpiece plane.

5. The method according to claim 4, wherein the position of the one of the workpiece blank and the remnant is maintained within the workpiece plane by a holding force while the other of the workpiece blank and the remnant is moved perpendicularly to the workpiece plane.

6. The method according to claim 5, wherein the holding force is supplied by gravity.

7. The method according to claim 1, wherein the workpiece plane is oriented horizontally, and wherein moving the workpiece blank and remnant relative to one another comprises executing a vertical movement, after which movement one of the workpiece blank and remnant is positioned above the other of the workpiece blank and remnant.

8. The method according to claim 7, further comprising, after executing the vertical movement, holding the one of the workpiece blank and remnant in its position above the other of the workpiece blank and remnant.

9. The method according to claim 7, wherein after executing the vertical movement, the remnant is positioned above the workpiece blank.

10. The method according to claim 7, wherein the separating movement is gravity-assisted, with gravity retaining one of the workpiece blank and remnant in the workpiece plane while the other of the workpiece blank and remnant is elevated.

11. The method according to claim 1, wherein moving the workpiece blank and remnant relative to one another is performed differently with respect to different areas of the workpiece blank or remnant.

12. A method of sorting a processed sheet-metal blank and a remnant of a metal sheet from which the blank was cut, the method comprising
   holding the processed sheet-metal blank and the remnant while the blank and the remnant are co-planar, with a holding unit of a handling device that positions the blank and the remnant within their plane;
   with the blank and remnant held, moving the blank and remnant relative to one another on the handling device with a separating movement perpendicular to their plane, to such an extent that the blank is displaced outside the remnant; and then
   moving the blank and remnant to different destinations.

13. A sheet metal handling device, comprising
   a carrier structure;
   a holding unit secured to the carrier structure and configured to hold a processed sheet-metal blank and a sheet-metal remnant from which the blank was cut, while the blank and the remnant are co-planar; and
   a lifting unit configured to lift one of the blank and remnant with a separating movement perpendicular to the plane, to such an extent that the blank is displaced outside the remnant.

14. The sheet metal handling device according to claim 13, wherein the holding unit is configured to position the blank and the remnant within their plane while moving the held blank and remnant away from a processing area.

15. The sheet metal handling device according to claim 13, wherein the lifting unit comprises a gripper that releasably secures the lifted one of the blank and remnant during the separating movement.

16. The sheet metal handling device according to claim 13, wherein the lifting unit is configured to releasably secure the lifted one of the blank and remnant by magnetic force or suction.

17. A sheet metal processing device, comprising
   a cutter configured to cut blanks from a metal sheet, such that the cut blanks remain surrounded by a remnant in a plane of the metal sheet; and
   a sheet metal handling device according to claim 13, arranged to handle the cut blanks and remnant after processing by the cutter.

* * * * *